United States Patent [19]
Drury et al.

[11] Patent Number: 5,452,459
[45] Date of Patent: Sep. 19, 1995

[54] METHOD AND APPARATUS FOR ALLOCATING SERVER ACCESS IN A DISTRIBUTED COMPUTING ENVIRONMENT

[75] Inventors: William B. Drury, Framington; Yun-Ping Hsu, Hudson, both of Mass.

[73] Assignee: Digital Equipment Corporation, Maynard, Mass.

[21] Appl. No.: 2,197

[22] Filed: Jan. 8, 1993

[51] Int. Cl.⁶ .......................... G06F 9/44; G06F 13/14
[52] U.S. Cl. ...................... 395/700; 395/650
[58] Field of Search .......................... 395/600, 650, 700

[56] References Cited

U.S. PATENT DOCUMENTS

| | | | |
|---|---|---|---|
| 5,280,610 | 1/1994 | Travis, Jr. et al. | 395/600 |
| 5,307,490 | 4/1994 | Davidson et al. | 395/650 |
| 5,321,808 | 6/1994 | Rupp | 395/164 |

Primary Examiner—Kevin A. Kriess
Assistant Examiner—Dennis M. Butler
Attorney, Agent, or Firm—Dirk Brinkman; Ronald C. Hudgens; Arthur W. Fisher

[57] ABSTRACT

In a distributed computing environment (DCE), a scheduler process executes on every DCE processor. The schedulers mediate all remote procedure calls (RPCs) made by client processes to server processes using a scheduler and/or namespace accessible by the DCE processor. The scheduler database stores interfaces of single-thread servers, and the namespace stores interfaces of multi-thread servers. The scheduler, in response to receiving an identity of an interface from a client process searching the scheduler database and namespace to locate the interface. Upon locating the interface, the interface is provided to the client process so that client and server processes can be bound.

5 Claims, 5 Drawing Sheets

METHOD AND APPARATUS FOR ALLOCATING SERVER ACCESS IN A DISTRIBUTED COMPUTING ENVIRONMENT

TABLE OF CONTENTS

1. BACKGROUND OF THE INVENTION
    1.1 Clients, Servers, and Interfaces, and RPCs in a DCE Environment
    1.2 Multi-Threaded Servers
    1.3 Backward Compatibility Problems of Single-Thread Servers
    1.4 Prior Attempts to Accommodate Single-Thread Servers in the DCE
2. SUMMARY OF THE INVENTION
    2.1 Basic Operation
    2.2 Transactional Context
    2.3 Cache of Known Servers
3. BRIEF DESCRIPTION OF THE DRAWINGS
4. DETAILED DESCRIPTION OF SPECIFIC EMBODIMENTS
    4.1 Primary Elements and Associated Procedures
        4.1 (a) Scheduler Location of an Interface
        4.1 (b) Client Queuing
        4.1 (c) Releasing the Process
        4.1 (d) Transactional Context
    4.2 An Enhanced Scheduler Embodiment
    4.3 Method of Searching for Bindings
    4.4 Data Transform Model
CLAIMS
ABSTRACT

BACKGROUND OF THE INVENTION

The invention relates to a method for locating and scheduling access to "servers" in a distributed computing environment. More specifically, the invention relates to a method for locating and scheduling access to servers that operate in the OSF distributed computing environment commonly referred to as "DCE." The invention is particularly useful with respect to access to a single-thread DCE server process by a context-sensitive client process.

The discussion below refers at several points to a useful reference work by three employees of the assignee of this application, "Understanding DCE," by Ward Rosenberry, David Kenney, and Gerry Fisher (Sebastopol, Calif.: O'Reilly & Associates, Inc., 1992), hereinafter referred to as [RKF], which is incorporated by reference as background information well-known to those of ordinary skill.

1.1 Clients, Servers, and Interfaces, and RPCs in a DCE Environment

In the OSF DCE environment, service requests may be transmitted as "remote procedure calls" (RPCs) that conform to a standard specification. RPCs permit standardized communication among nonidentical and even nonstandard components in a DCE network.

A special category of program instructions in the DCE environment is referred to as "stub code." Generally speaking, stub code comprises standard program instructions that act as a communications interface between a main program (either a client program or a server program) and one or more remote processes. See generally [RKF] sections 3.1.2 and 3.5.

(Those of ordinary skill having the benefit of this disclosure will of course recognize that descriptions of program code performing a particular function, e.g., stub code "acting" as a communications interface, are in fact convenient and conventional shorthand references to the operation of one or more processors executing instructions comprising the program code.)

The term "server" is commonly used to refer to a computer program, executing on an appropriate processor system ("server host"), that carries out service requests made by, e.g., other computer programs that may be executing on the same or other computer systems. In most implementations a server executes on a specified computer and receives service requests from other computers over a communications network. See generally [RKF] at section 1.2.

More specifically, an RPC "server" is commonly defined as a "process" that "exports" one or more "interfaces" capable of being invoked by remote clients. A "process" refers generally to the execution by a physical processor (or processor system) of one or more series of instructions in a specified "address space,", i.e., a system environment that includes particular physical resource allocations, open files, static data, etc.

The term "interface" in the DCE environment refers generally to a formal specification of inputs and outputs for a specified service, wherein a service request that complies with the input specification results in a server process acting to generate output that complies with the output specification. The term "export an interface" generally refers to the transmittal by a server process of pre-formatted information containing interface and binding specifications to a namespace server for recordation in a "namespace" server data structure." See generally [RKF] section 9.3.

Generally speaking, a client process that desires to invoke a server interface sends a request (e.g., an RPC) to the namespace server requesting a "binding handle" for the server in question that implicitly encodes the network address of the server; the client may subsequently use the binding handle in a single RPC to request that services be performed by the server. The client may indicate via an RPC argument that the server's services are desired over a series of RPCs in connection with a "transaction," i.e., a series of related service requests. In such a situation the server maintains the "context," the system state, and the binding handle remains valid, until the client indicates (again via an RPC argument) that the transaction is complete.

Thus, a server that exports an interface in effect is announcing (to "client" processes that are designed using a priori knowledge of the interface) that the specified kinds of outputs can be obtained from the server process. See generally [RKF] section 3.3.

In some implementations a single copy of the namespace server may be maintained, with all server access requests being processed at that copy. In larger implementations with a high number of network nodes, it might be more efficient to maintain a copy of the namespace server at several nodes or even at each node, with periodic internode communications for updating purposes. In either case, a node on which a copy of the namespace server is maintained is referred to herein as a namespace server.

1.2 Multi-Threaded Servers

The DCE environment permits a wide variety of computer systems and subsystems to be "connected" together for mutual sharing of resources. Some systems may be capable of multi-thread operation, while others may be capable only of single-thread operation.

(As is well-known to those of ordinary skill, generally speaking a "thread" is a sequence of computer instructions. A given process may have multi-thread capability. That is, the operating system supporting the process may be designed so that the physical processor system rotates its actual processing activity among several different series of program instructions, or "threads," in a specified sequence, or possibly in accordance with a priority scheme, with all threads using the same address space.)

The OSF DCE specification assumes all servers to be multi-thread in nature and thus able to handle multiple concurrent calls. A multi-thread DCE server comprises a single process capable of executing multiple threads by sharing the process's address space among its threads using mutexes (mutual exclusion locks) or global locks. Such mechanisms are used to protect portions of memory that must remain constant while a particular thread "waits" for the processor's attention (i.e. while the processor is executing instructions from another thread). When a service request or "call" is received by a multi-thread server, a specific thread (referred to as a "call executor" thread) is allocated to handle the call. As each thread completes its processing of a call, it becomes available for assignment to another call. See generally [RKF] chapter 4.

A single-thread process intended as a would-be server, on the other hand, would be able to handle only one request for service at a time. Service requests would necessarily be executed serially instead of concurrently. (Single-thread processes are sometimes referred to as "non-reentrant" because they cannot share an address space among independent service requests.)

1.3 Backward Compatibility Problems of Single-Thread Servers

Single-thread servers present a fundamental problem in the DCE environment because the design of the DCE assumes that any necessary scheduling of server resources for handling service requests is handled locally at each server. As noted above, the DCE protocol is designed to permit the sending of multiple concurrent requests to a single server. See generally [RKF] section 4.2. The lack of backward compatibility with existing single-thread application programs that cannot be used as DCE servers thus presents a significant "chicken and egg" barrier to the growth of DCE computing. Specifically, the present size of the DCE installed base might not justify the cost and difficulty of creating thread-compliant implementations from non-reentrant software. Many existing computer systems operate environments where single-threaded (and therefore non-reentrant) server-type software is assumed. Vendors of such "legacy" software often are economically forced to allocate resources to servicing their own installed base of non-reentrant products. It follows that for such vendors, conversion to thread compliance might not be a priority until the DCE installed base expands. Such expansion might not occur, however, until the availability of software expands.

1.4 Prior Attempts to Accommodate Single-Thread Servers in the DCE

To some extent, the creators of the DCE environment anticipated backward compatibility problems. As a result, a limited workaround was designed into the standard DCE software. The basis of the solution is the availability of a "global lock." Under this scheme, if a thread must execute non-reentrant code then it must first acquire the global lock. Once a thread has acquired a global lock it can execute to completion, secure in the knowledge that no other thread will execute simultaneously utilizing the resources controlled by the global lock. Because client processes can rarely be certain that service requests will not involve non-reentrant code, nearly all requests will indeed involve obtaining the global lock. Operation in such a mode can essentially paralyze the client processor system (especially in the event of a "hangup" in a thread that has the global lock) and eliminate the benefits of multi-thread computing.

A variation on the global lock solution is the "jacket routine," which represents a refinement of the basic global lock concept with respect to certain commonly used, non-reentrant, UNIX system calls. In order to enable the use of these system calls, DCE Threads (an implementation of threads standard in the DCE), provides a jacket routine. Instead of making a UNIX system call, threads call the corresponding jacket routine. The jacket routine acquires the global lock, runs, then releases the global lock. See generally [RKF] section 4.2. The use of jacket routines can cause the same problem as the use of global locks.

Two other potential solutions are proposed in a memorandum dated Sep. 4, 1992, privately distributed by Tandem Computer Corporation, a copy of which is being filed with an information disclosure statement in conjunction with this application. The first proposed approach assumes the use of single-thread DCE servers in conjunction with a "monitor process" that directs the clients to bind and rebind with the appropriate server. Specifically, the client: 1) issues an RPC to the monitor asking for a binding for an idle server; 2) uses the binding to issue at least one RPC to the server; and 3) issues an RPC call to the monitor to release the server. The advantage of this approach is that the server can only be accessed by one client at a time and that the client can access servers on more than one host. A disadvantage to this approach is performance, because it requires RPC calls every time a server is selected.

The Tandem memorandum recognizes that some problems would exist with this approach. First, once a server is allocated to a particular client process, it is unavailable to other clients until the particular client issues a release RPC to the monitor. That allows the client to make several RPC calls while in possession of the server. Because the client may wait an arbitrary length of time between calls (subject to any system timeout constraints), the server may sit idle for significant periods of time. Furthermore, runtime threads may be blocked resulting in network problems. Second, the allocate and release calls increase network traffic. Third and perhaps most significantly, the setup overhead (for establishing a connection) is repeated every time a client switches from one server to another.

The second approach proposed in the Tandem memorandum seeks to solve the problem by enhancing the server's duties and subdividing it into two process types: 1) a "server master process" that would act as the communication endpoint and the place where RPC runtime state is maintained; and 2) an "agent process" that would run the application manager code. The agent process thus would serve as an extension of a call executer thread of the server master process, with one agent process assigned to each client request. This division of function would allow the server's stub code and its manager function to run in separate processes thereby eliminating scheduling and protection problems.

A possible disadvantage of the agent-process approach would be the overhead associated with two context switches per RPC. Moreover, it might be necessary for the server master-process program to be designed with knowledge of every agent-process program, which could be an administrative burden especially in terms of keeping the server master-process program up to date.

2. SUMMARY OF THE INVENTION

In a system in accordance with the invention, a "scheduler" program executes on every DCE supervisor host. Each scheduler transparently mediates all RPCs directed to the copy of the DCE interface database and/or namespace residing on that DCE supervisor host. The scheduler maintains and utilizes a "scheduler database" (Schd-DB) of single-thread servers that is functionally analogous to, but separate from, the DCE namespace.

A server exports an interface by calling the standard DCE RPC export services or by calling the scheduler program. If the server exporting the interface is multi-threaded, it calls the standard export services to pass the information to the namespace server and/or endpoint mapper. On the other hand, if the server exporting the interface is single-threaded, then it exports its interface by calling the scheduler that in turn installs binding information for the exporting single-threaded server in the scheduler database.

When the scheduler receives a request for a binding to a particular server, it attempts to fill the request from, in order: 1) a cache of recent binding requests, then 2) from the Scheduler DB, and finally 3) from the namespace server.

Thus, broadly speaking the invention is roughly analogous to an adapter that permits an American 60 Hz electrical appliance (a single-thread server) to be plugged into a European 50 Hz wall socket (the DCE environment) by allowing the use of non-reentrant routines in the DCE environment. It accomplishes this goal by maintaining "context" between server and client. This "adapter" facilitates expansion of the DCE installed base thereby helping resolve the chicken and egg problem described above.

2.1 Basic Operation

In accordance with the invention, upon RPC initialization, each process of each multi-process server executes the normally required RPC initialization operations and rpc_listen( ) in order to receive requests. As part of initialization, each process registers its existence with the Schd-DB by providing the same data as required for standard RPC server registration.

Clients of multi-process servers obtain services by invoking a "binding resolution service" of the scheduler to obtain a binding handle to an appropriate RPC server. More specifically, a client invokes a binding resolution service by providing the scheduler with the same set of data as required by a standard RPC interface when obtaining a server binding handle. The scheduler then consults the Schd-DB which maintains a database of processes and the availability status of each. If an appropriate process is available, the scheduler provides the corresponding binding handle to the client. If all appropriate processes are being used then the client is put in queue by the scheduler.

Because a multi-process server has only one thread, the requesting client obtains control over the server. Therefore, after using the server, the client must invoke a "binding release service" to notify the scheduler that the client has released the server. This allows the scheduler to re-allocate the server to another client.

2.2 Transactional Context

One embodiment of the invention is concerned with "transactional context." Transactional context refers to the situation where a client, while acquiring a binding handle, indicates that the context of the binding is to be coordinated with the currently executing transaction. When the client initiates a transactional context the scheduler proceeds as follows: 1) if the same client invokes the binding resolution service for the same interface, during the same transaction, then the scheduler provides the same binding handle; 2) the scheduler coordinates with the "transaction manager" to otherwise prevent the reallocation of the same binding handle until the executing transaction is completed.

In transactional context, once the client establishes context with a server process, the context persists throughout the transaction without further burdening the client. Furthermore, the client need not invoke a binding release service because the scheduler has coordinated with the transaction manager. Via their pre-established agreement, the transaction manager notifies the scheduler that the transaction is over so the server may be released.

In addition to multi-process servers, transactional context applies to any server located via the scheduler in the DCE namespace. This is because the "binding resolution service" may be invoked to obtain the binding for either a multi-process server or for any server registered in the namespace. Specifically, when the client invokes the binding resolution service, the client specifies a desired interface. The scheduler searches for the interface, first in the scheduler database then in the namespace. Therefore, the client can access either a multi-process server or an RPC server registered in the namespace without being aware of the internal implementation of the target server. Furthermore, the isolation of the client from the server implementation allows for the upgrade the servers (to full multi-threaded servers) without affecting the client programs because the client does not know what kind of server it is calling. Therefore, the client can remain undisturbed and operate "business as usual" even if a single-threaded server is upgraded to a multi-threaded server.

2.3 Cache of Known Servers

In another embodiment the scheduler is configured to provide very efficient binding resolution by maintaining an internal cache of known servers and corresponding addressing information. If the scheduler finds an appropriate binding in the cache then a database call is avoided thereby conserving time and network resources. This caching mechanism is particularly suited to environments like that of commercial systems where the same set of services are invoked repetitively.

4. DETAILED DESCRIPTION OF SPECIFIC EMBODIMENTS

A detailed description of the architecture of a method in accordance with the invention is set out below. In the interest of clarity, not all features of an actual implementation are described in this specification. It will of course be appreciated that in the development of any such actual implementation (as in any software development project), numerous programming decisions must be made to achieve the developers' particular goals and sub-goals (e.g., compliance with system- and business-related constraints), which will vary from one implementation to another. Moreover, attention will necessarily be paid to, e.g., proper serialization to handle concurrent events. It will be appreciated that such a development effort might be complex and time-consuming, but would nevertheless be a routine undertaking of program development for those of ordinary skill having the benefit of this disclosure.

4.1 Primary Elements and Associated Procedures

4.1 (a) Scheduler Location of an Interface

Figure 1:
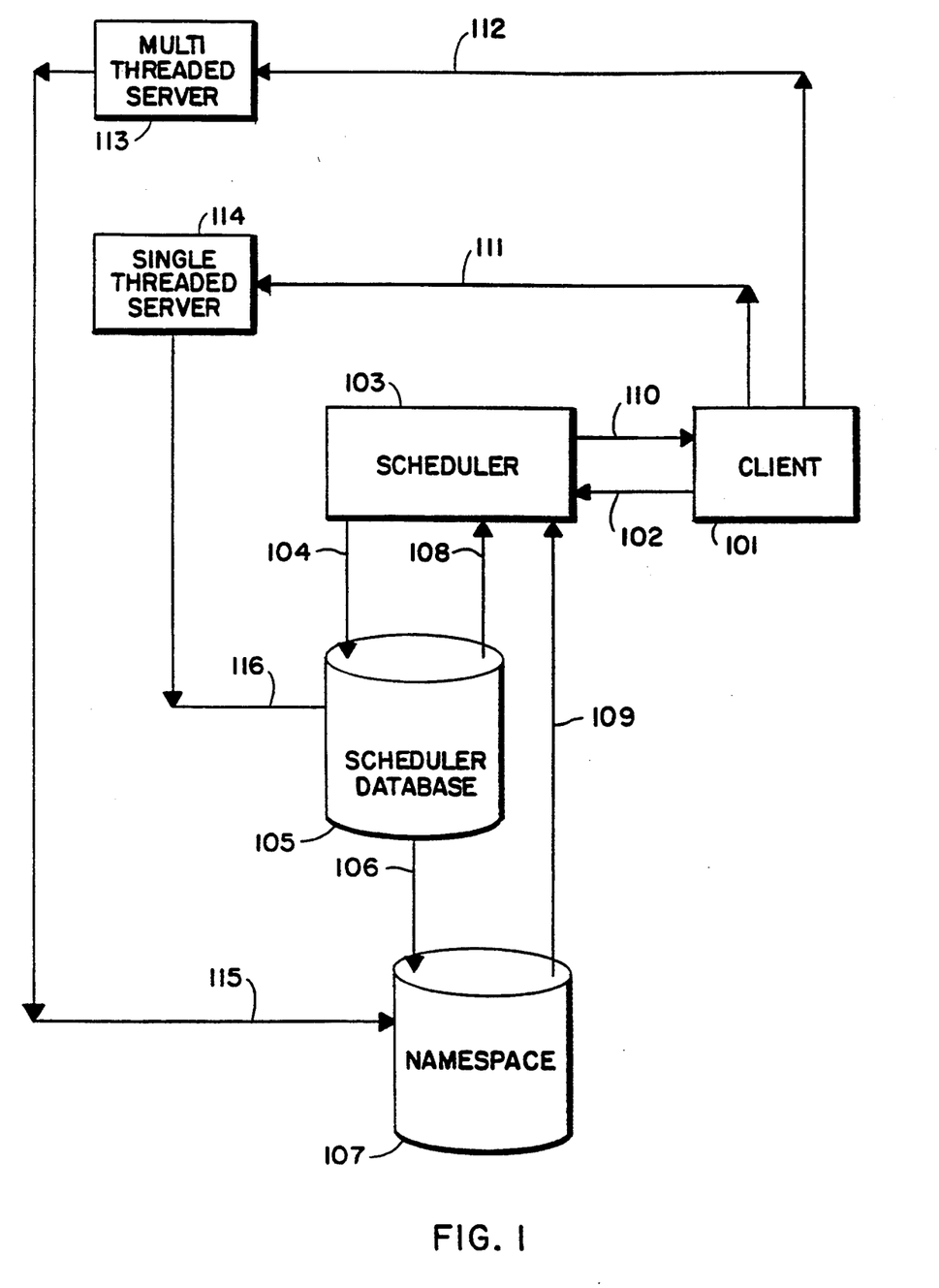
FIG. 1 shows the primary elements of a basic embodiment of the invention. The multi-threaded server 113 provides information to the namespace 107. The multi-process server 111 provides information to the scheduler DB 105. The client process 101 makes requests that are handled by the scheduler 103. The scheduler 103 uses scheduler DB 105 and namespace 107 to help handle the client's 101 request.

FIG. 1 shows the conceptual elements of one embodiment of the current invention. Upon RPC initialization, a single-thread, multi-process server 114 registers itself in a scheduler database 105. Also upon initialization, a multi-thread, single-process server 113 registers itself in namespace 107 by providing an interface identifier and binding information. If there were other servers present, all multi-process types would register in the scheduler database 105 and all multi-thread types would register in the namespace.

At some future point, client 101 decides to access a server. Toward that end, client 101 requests a binding for a specific server interface by providing an interface ID. The request is received by the scheduler 103 which in turn initiates a search for an appropriate interface.

The scheduler 103 searches two data structures, one after the other: 1) The scheduler database 105; and 2) the namespace 107. First, the scheduler 103 calls the scheduler database 105 to check if any multi-process server 114 offers an appropriate interface. If an appropriate interface is found in the scheduler DB 105 then the search is terminated and the binding of the found interface is transferred to the requesting client 101. If an appropriate interface is not found in scheduler DB 105, then the scheduler 103 continues its search calling the namespace 107. If an appropriate interface is found in namespace 107, then the corresponding binding is transferred to the requesting client 101. If an appropriate interface is not found in the namespace 107, then the scheduler 103 generates an error message.

4.1(b) Client Queuing

When an appropriate interface is found in the scheduler DB 105, the scheduler 103 transfers to the client 101 a binding for a multi-process server 114. The binding enables the client 101 to locate and access the desired server 114.

Sometimes, the scheduler 103 finds an appropriate yet unavailable interface in the scheduler DB 105. Since multi-process servers 114 are single threaded, the scheduler cannot assign multiple clients to a single server. Therefore, if no appropriate interfaces are available, the scheduler 103 places the client 101 in its queue.

When an appropriate interface is found in the namespace 107, the scheduler 103 transfers to the client 101, a binding to a multi-threaded server 113. If no threads are available, the standard RPC queuing mechanism activates.

4.1(c) Releasing the Process

In a DCE, by definition, a client 101 only accesses a server for a limited period of time. During the period of server access client 101 uses server resources to accomplish a limited task. When client 101 completes its task on multi-process server 114, then client 101 must relinquish binding handle 202. When releasing binding handle 202, client 101 invokes a "binding release service." A binding release service notifies the scheduler 103 that the server 114 is released thereby allowing reallocation of the resource.

4.1(d) Transactional Context

Figure 2:
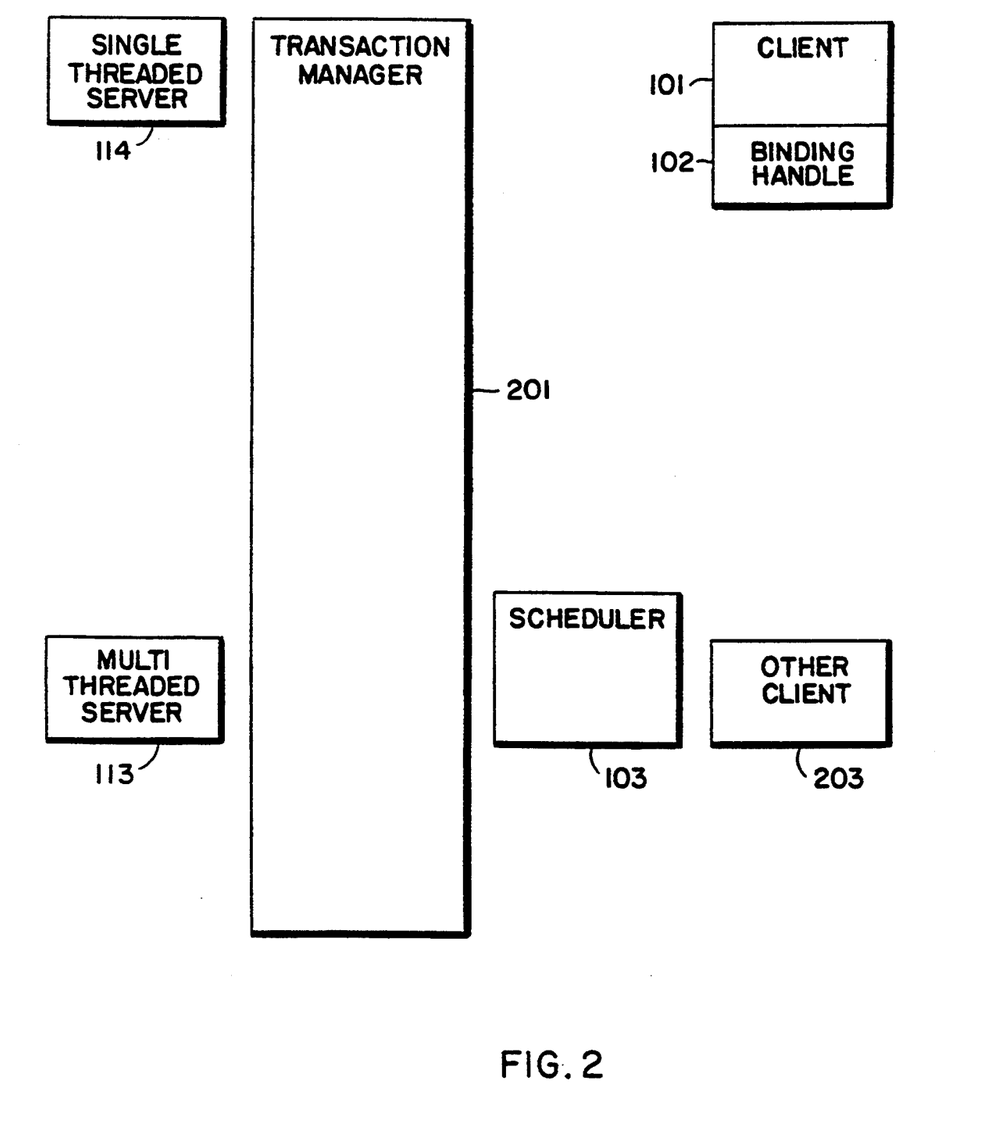
FIG. 2 shows the elements involved in the implementation of transactional context. The transaction manager 201 mediates between the servers 113, 114 and the clients 101, 203. As shown, client 101 has already received a binding handle 202 from scheduler 103.

The elements of FIG. 1 can operate in an alternate embodiment called the transactional context. In the transactional context, the scheduler 103 slightly changes its procedure in order to accommodate a slightly different request from the client 101. FIG. 2 shows the primary elements involved in transactional context operation. Transaction manager 201 is explained in X/Open documentation, specifically the "X/Open Guide, Distributed Transaction Processing Model" distributed by X/Open Co., Ltd., ISBN 1 872630 16 2. Briefly, the function of the transaction manager 201 is to monitor transactions to assure that they are atomic. As a result, transaction manager 201 knows when client 101 begins and ends a transaction with any server. FIG. 2 illustrates the discrete point in time occurring just after the client 101 has acquired a binding handle 202 from the scheduler 103.

When acquiring a binding, the client 101 may notify the scheduler 103 and activate transactional context. As a result, the scheduler 103 alters its behavior. The scheduler 103 coordinates with the local transaction manager 201 such that the transaction manager 201 notifies the scheduler 103 when the transaction is terminated. Scheduler 103 does not reallocate the same binding handle until the transaction is terminated, other than to the same client seeking the same interface. For example, suppose client 101 makes a subsequent request for the same interface, before the transaction is terminated. Scheduler 103 assigns the same binding handle 202. However, if during the transaction, other client 203 requests the same interface from the scheduler, then scheduler 103 does not assign binding handle 202 even if client 101 is not accessing its assigned interface (server 113 or 114) at the time.

Transactional context allows a client to establish and maintain context with a server throughout a whole transaction. When the currently executing transaction is over the transaction manager 201 notifies scheduler 103 and then scheduler 103 makes binding handle 202 available for allocation. Since the scheduler 103 is notified by the transaction manager 201, it is unnecessary for the client to invoke the binding release service.

4.2 An Enhanced Scheduler Embodiment

Figure 3:
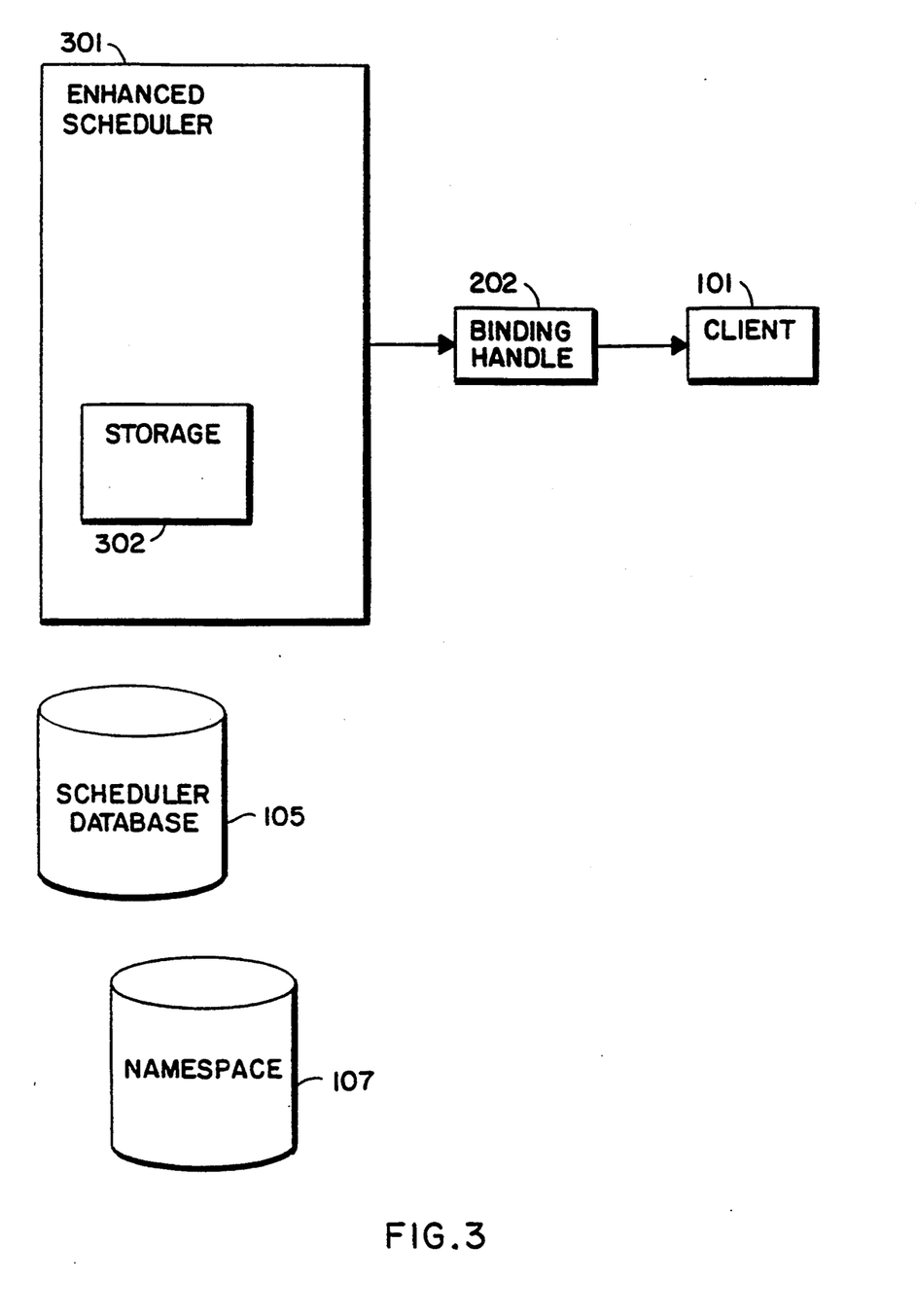
FIG. 3 shows the elements directly affected by the use of an enhanced scheduler 301. Enhanced scheduler 301 comprises storage unit 302.

The embodiment of FIG. 1 may also be implemented with an enhanced scheduler 301. The enhanced scheduler 301 operates essentially identically to the scheduler 103 except the enhanced scheduler 301 incorporates a storage unit 302 and uses a more complex method to locate an appropriate binding. FIG. 3 shows the elements directly affected by the use of an enhanced scheduler 301.

Storage unit 302 can be any medium for data storage. It can be physically located in any memory accessible to the scheduler 301. In one embodiment, storage unit 302 holds a record of "contexts" that were created by previous binding assignments. For example, after RPC initialization, client 101 may invoke a binding resolution service from enhanced scheduler 301. In response, enhanced scheduler 301 may locate binding 202 and assign it to client 101. Enhanced scheduler 301 would then store the connection context in storage unit 302. More specifically, the scheduler 301 stores binding 202 along with information that keys binding 202 to a specific interface.

The storage unit 302 holds data for any convenient length of time. In the transactional context, a very efficient form of binding resolution is achieved by using storage unit 302 as a cache type memory storing client-/server relationship data. In this configuration, the requesting client makes a binding request and indicates a transactional context. The storage unit 302 may then be required to hold the context data for a length of time equal to the transaction length. The schedulers easy access to the storage unit results in greater efficiency when the same client requests a binding for the same interface.

4.3 Method of Searching for Bindings

Figure 4:
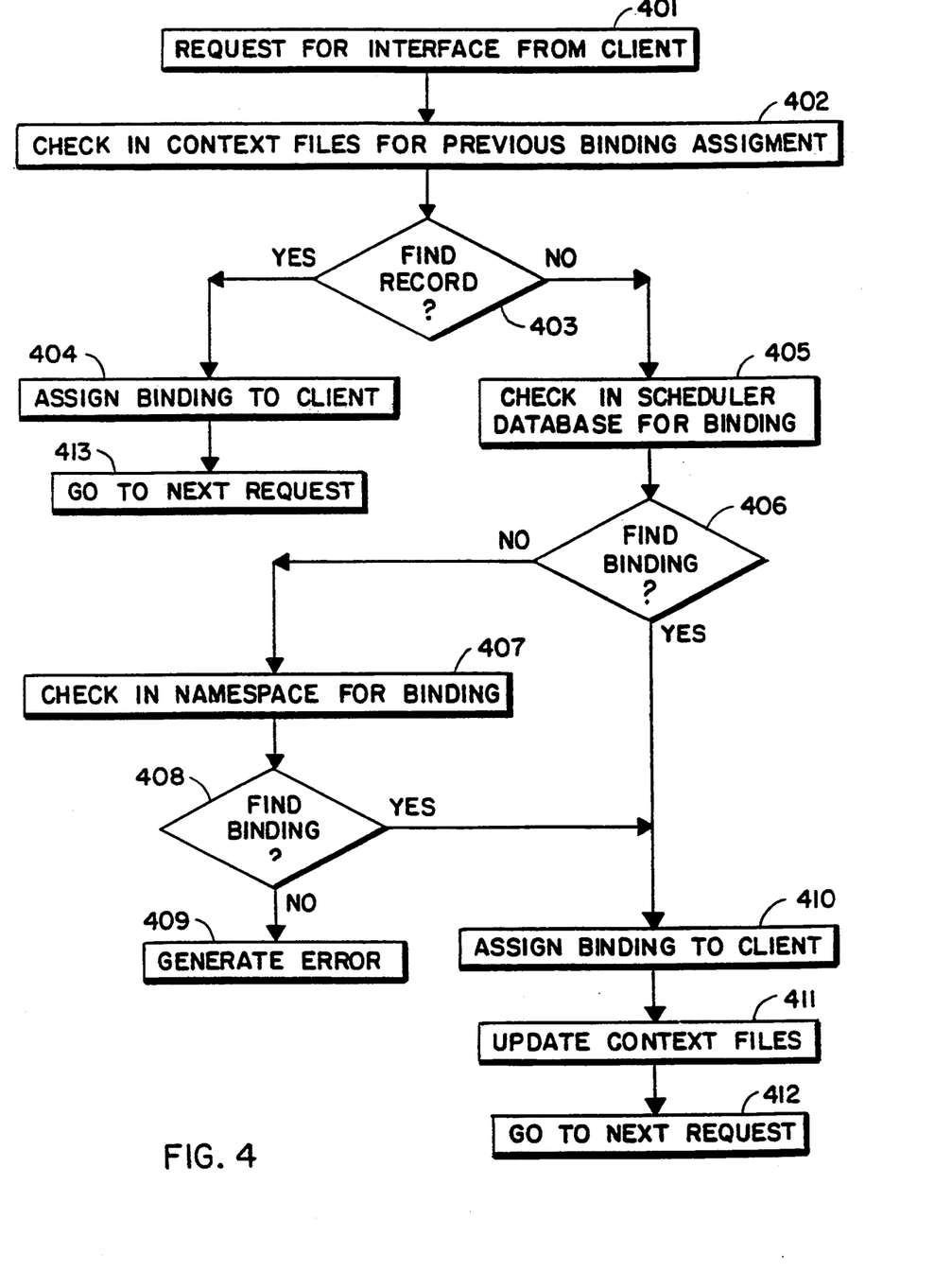
FIG. 4 is a flow diagram for a method of the invention.

In one embodiment, the invention uses the method outlined in FIG. 4 to retrieve and assign bindings. Referring to FIG. 3, storage unit 302 is used to preserve context files containing data which describes the relationship between bindings and interfaces.

Referring to FIG. 4, block 401 shows that the method begins when a client requests an interface. Control moves to block 402 where the first task of the method is to check in the context files for an appropriate interface. Control automatically passes to decision block 403. If an appropriate interface was found then decision block 403 passes control to block 404 and a binding is assigned to the client. From block 404 control passes to block 413 which directs control to go to the next client request.

Moving back to decision block 403, if no appropriate record was found in the context files, control is passed to block 405 and the scheduler database is searched. Control then automatically passes to decision block 406. If an appropriate interface was located in the scheduler database then control passes to block 410 and the binding is assigned to the requesting client. Control then passes to block 411 and the context files are updated. Specifically, the server/client relationship is stored as a context. Control then passes to block 410 and is directed to the next client request. Referring back to decision block 406, if no appropriate binding was found control passes to block 407 and the namespace is searched for an appropriate binding. Control automatically passes to decision block 408. If no binding was found in the namespace then control passes to block 409 and an error message is generated. If a binding was found in the namespace then control passes to block 410 and proceeds through to 412 as outlined above.

This method can drastically increase the efficiency of locating a binding. Efficiency gains are realized if the scheduler can search storage unit 302 relatively fast as compared to searching the scheduler database 105 or the namespace 107. A search of the storage unit 302 is inherently fast relative to the other searches because the storage unit 302 typically contains fewer entries than the namespace 107 or scheduler database 105. The storage unit 302 can achieve an additional and non-inherent speed advantage through its location. Conceptually, the storage unit 302 is fastest to search if it is located within the scheduler 301. Physically, such memory is likely to be located in dedicated cache or in memory space allocated solely to the scheduler.

4.4 Data Transform Model

Figure 5:
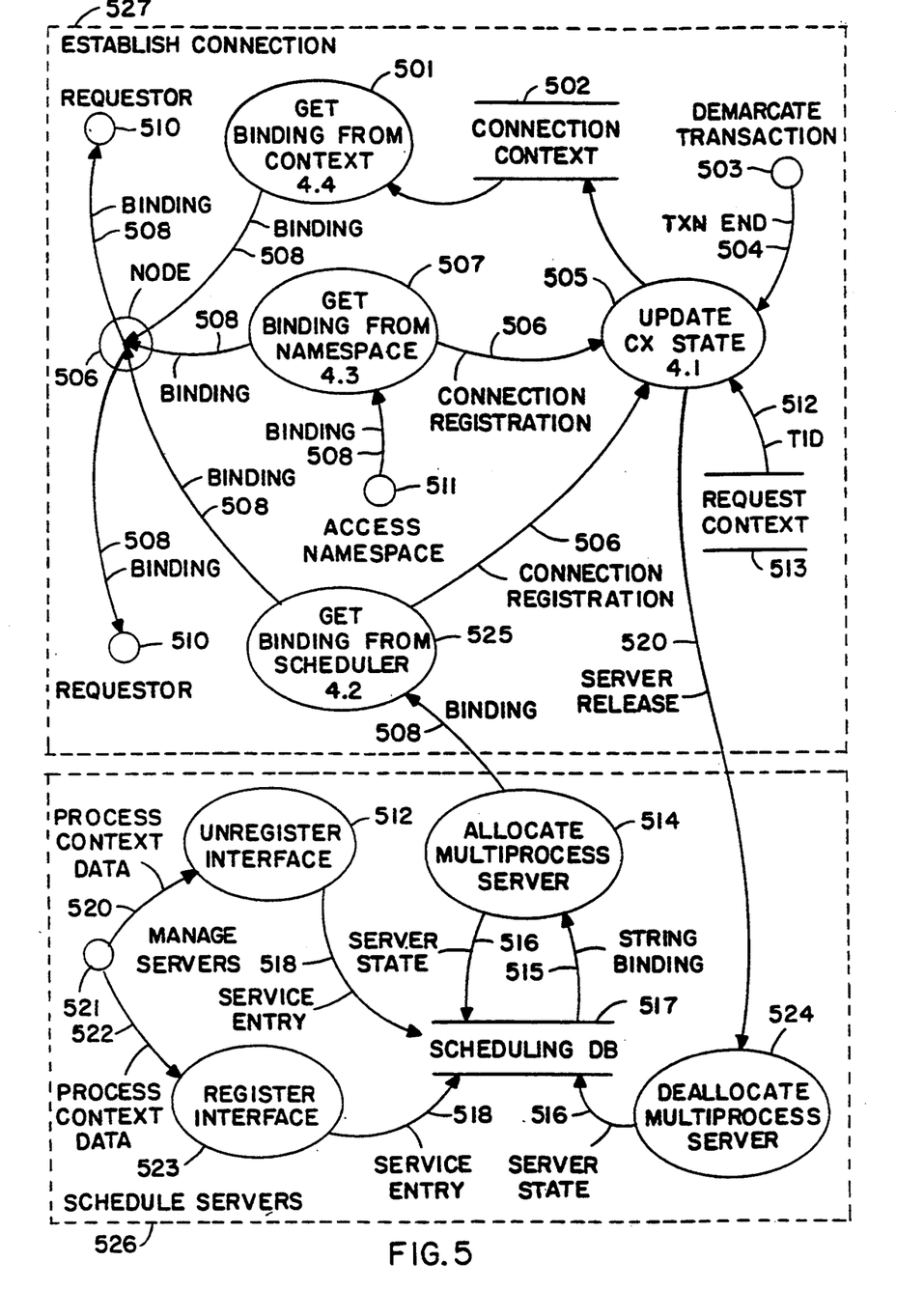
FIG. 5 is a data flow diagram for one embodiment of the invention.

The invention can be described as a collection of data transforms and data structures. FIG. 5 is a data flow diagram for an implementation of the invention described in data-transform terms. The data flow can be conceptually divided into two sections: 1) Establish Connection data transform 527 which is implemented by the Connection Mapper component that resides in the client address space; 2) Schedule Servers data transform 526 which operates in the targeted operating system environment and physical environment. The elements of FIG. 5 are defined as follows:

Service Requestor 510: This is the user of system services (e.g., a client process).

Binding 508: This indicates that a binding is being transferred from one node to another. Recall that a binding is address information sufficient for an RPC client to invoke an RPC server.

Get Binding From Context 501: This is a data transform that retrieves the bindings from connection context 502 (connection context 502 is analogous to storage unit 302).

Access Namespace 511: This indicate that the standard DCE RPC namespace is invoked to obtain a binding. This is used to obtain bindings for standard multithread servers.

Connection Context 502: A data store used by Establish Connection 527 which contains zero or more connection context elements, as well as a transaction hash table of pointers used to quickly locate connection context elements associated with a particular transaction. This is analogous to storage unit 302.

Connection Registration 506: An aggregate data element containing information used by Establish Connection 527 to maintain the state of the client-to-binding relationship. This information comprises the client for which this information is being maintained, the transaction identification, the namespace—entryname, the server interface specification, the source of the binding information (either Schedule Servers 526 or Access Namespace 511), the context semantics specified by the client, and the binding. Update CX State 505: This manages information in Connection Context 502. Management tasks comprise: 1) adding entries that are successfully obtained from the namespace or the scheduler database; 2) removing entries when transactions are completed.

Txn End 504: The Demarcate Transaction data transform calls this routine to indicate the specified transaction has completed. The Establish Connection data transform uses this indication to terminate the transaction's client-server relationship(s) and release any binding information maintained for this transaction. This routine accepts one argument, namely the transaction identifier (TID).

Demarcate Transaction 503: Provides services to begin, end, and signal completion of a transaction. For example Txn End 504 signals a the end of a transaction.

Get Binding From Namespace 507: Calls Access Namespace 511 to retrieve a binding. If a binding is successfully retrieved, it is sent to Service Requestor 510 and information is passed to Update CX State 505 so that Connection Context 502 may be updated.

Get Binding From Scheduler 525: Calls Schedule Servers 526 to retrieve a binding. If a binding is successfully retrieved, it is sent to Service Requestor 510 and information is passed to Update CX State 505 so that Connection Context 502 may be updated.

Request Context 513: This represents a data store that contains the transaction identification for the current transaction.

Server Release 528: Information used by Schedule Servers 526 to de-allocate a server process previously allocated by Establish Connection.

Register Interface 523: This routine calls the DCE RPC runtime to register the server's interface(s) and obtain a vector of bindings. The bindings for single threaded servers are exported to the scheduler database 517. The bindings for multi-threaded servers are exported to the namespace using the standard DCE RPC naming export services.

Unregister Interface 519: This routine is provided to unregister a server interface from the scheduler database 517.

Allocate Server 514: This routine accesses the scheduling database to allocate an available server process of a MPST (multi-process, single threaded) server identified by the interface ID.

Deallocate Server 524: This routine changes the status of a previously allocated server process to be available and checks if there is any waiting client on the waiting list for the particular MPST server. If so, it writes to the client process' FIFO to notify the availability of such server process.

Scheduling DB 517: Scheduling DB is the repository for server scheduling data.

Service Entry 518: Service Entries are entries in the Scheduling Database representing a MPST server.

Server State 516: "Server State" represents the state of the specified server process within a MPST server (or what the state should be).

String Binding 515: String Binding contains the character representation of a binding handle.

Process Context data 520: This represents the data that is required for a server to register or unregister it interfaces. Specifically, it is the identification of the server's interfaces.

It will be appreciated by those of ordinary skill having the benefit of this disclosure that numerous variations from the foregoing illustration will be possible without departing from the inventive concept described herein. For example, those of ordinary skill having the benefit of this disclosure will recognize that logical functions described above as being implemented in software can equivalently be implemented in hardware, e.g., through the use of discrete logic circuitry, and vice versa; likewise, a general-purpose processor operating under program control could equivalently be replaced by one or more special-purpose chips designed to perform the programmed functions; and so forth.

Accordingly, it is the claims set forth below, and not merely the foregoing illustration, which are intended to define the exclusive rights claimed in this application.

What is claimed is:

1. In a network of processors and a memory connected to each other by a communications bus, the processors to execute processes and each processor executing a scheduler, the processes including clients and servers, each server including an interface having an identity, the servers including single-thread servers and multi-thread servers, a method for binding a client to a server comprising:
  registering the interfaces of the single-thread servers in a scheduler database of the memory;
  registering the interfaces of the multi-thread servers in a namespace of the memory;
  providing, by a client executing on a client processor, an identity of an interface to a scheduler, the scheduler executing on the client processor;
  searching, by the scheduler, the scheduler database using the identity to locate the interface of a single-thread server, and if the interface is not located in the scheduler database, then searching the namespace to locate the interface of a multi-thread server; and
  providing, if the interface was located in the schedular database and if the single-thread server is available and otherwise if the interface was located in the namespace, the interface to the client to bind the client to the server.

2. The method of claim 1 wherein the memory includes a context database, and further comprising:
  in response to providing the interface to the client, storing information related to the client, the server, and the interface in a context database of the memory;
  providing, subsequent to the storing the information in the context database, the identity to the scheduler;
  searching, by the scheduler, the context database for the information related to the client, the server, and the interface, to locate the interface; and
  providing the interface to the client from the context database.

3. The method of claim 2 wherein the context database is located in a portion of the memory which is allocated to the scheduler.

4. The method of claim 1 further comprising:
  queuing, if the interface was not located in the namespace, the identity of the interface.

5. The method of claim 1 further comprising:
  releasing, by the scheduler, the single-threaded interface in response to a completion notification by the client.

* * * * *